US010822207B2

(12) United States Patent
Lopez-Benedito et al.

(10) Patent No.: US 10,822,207 B2
(45) Date of Patent: Nov. 3, 2020

(54) POSITIONING ASSEMBLY FOR A WIND TURBINE ROTOR BLADE LIFTING DEVICE

(71) Applicant: General Electric Company, Schenectady, NY (US)

(72) Inventors: Daniel Lopez-Benedito, Barcelona (ES); John Carl Bell, Pearland, TX (US); Gaylon Mitchell Pfeiffer, Boston, MA (US); Theodore Steven Wilmot, Laurens, SC (US); Adam Sean Davis, Livermore, CO (US); Marc Cavalle, Barcelona (ES); Jordi Escola Belarte, Barcelona (ES); Bart Jan Veldkamp, Enschede (NL); Christoph Lammen, Salzbergen (DE)

(73) Assignee: General Electric Company, Schenectady, NY (US)

( * ) Notice: Subject to any disclaimer, the term of this patent is extended or adjusted under 35 U.S.C. 154(b) by 81 days.

(21) Appl. No.: 15/995,310

(22) Filed: Jun. 1, 2018

(65) Prior Publication Data

US 2018/0362306 A1 Dec. 20, 2018

(30) Foreign Application Priority Data

Jun. 20, 2017 (EP) .................................... 17382379

(51) Int. Cl.
*B66C 13/46* (2006.01)
*F03D 13/10* (2016.01)
(Continued)

(52) U.S. Cl.
CPC .............. *B66C 13/46* (2013.01); *B66C 1/108* (2013.01); *B66C 13/16* (2013.01); *B66C 13/18* (2013.01);
(Continued)

(58) Field of Classification Search
CPC ......... B66C 13/46; B66C 13/13; B66C 13/18; B66C 1/108; F03D 13/10; F03D 1/0658;
(Continued)

(56) References Cited

U.S. PATENT DOCUMENTS

| 2012/0098283 | A1 | 4/2012 | Maj et al. | |
|---|---|---|---|---|
| 2015/0028610 | A1* | 1/2015 | Hansen | .................. B66C 1/108 294/81.55 |
| 2015/0232304 | A1* | 8/2015 | Monux Belloso | ...... B66C 1/108 414/800 |

FOREIGN PATENT DOCUMENTS

| EP | 2 708 487 A1 | 3/2014 |
|---|---|---|
| EP | 2 832 675 A1 | 2/2015 |

OTHER PUBLICATIONS

Extended European Search Report and Opinion issued in connection with corresponding EP Application No. 17382379.0 dated Jan. 12, 2018.

* cited by examiner

*Primary Examiner* — Moshe Wilensky
(74) *Attorney, Agent, or Firm* — Dority & Manning, P.A.

(57) ABSTRACT

The present disclosure is directed to a lift system for a rotor blade of a wind turbine. The lift system includes a lifting device having at least one cradle. The cradle has a profile that corresponds to at least one of the exterior surfaces of the rotor blade so as to support at least a portion of the rotor blade. Further, the lift system includes a positioning assembly having at least one distance sensor mounted to the hub and at least one visual sensor mounted to the lifting device. Thus, the distance sensor is configured to identify a distance from the hub to the lifting device and the visual sensor is configured to identify a position of the rotor blade in the cradle.

20 Claims, 9 Drawing Sheets

(51) Int. Cl.
    *B66C 1/10*           (2006.01)
    *B66C 13/18*         (2006.01)
    *B66C 13/16*         (2006.01)
    *F03D 1/06*           (2006.01)

(52) U.S. Cl.
    CPC ........... *F03D 1/0658* (2013.01); *F03D 13/10* (2016.05); *F05B 2230/604* (2013.01); *F05B 2230/61* (2013.01); *F05B 2230/70* (2013.01)

(58) Field of Classification Search
    CPC ............ F05B 2230/604; F05B 2230/61; F05B 2230/70
    See application file for complete search history.

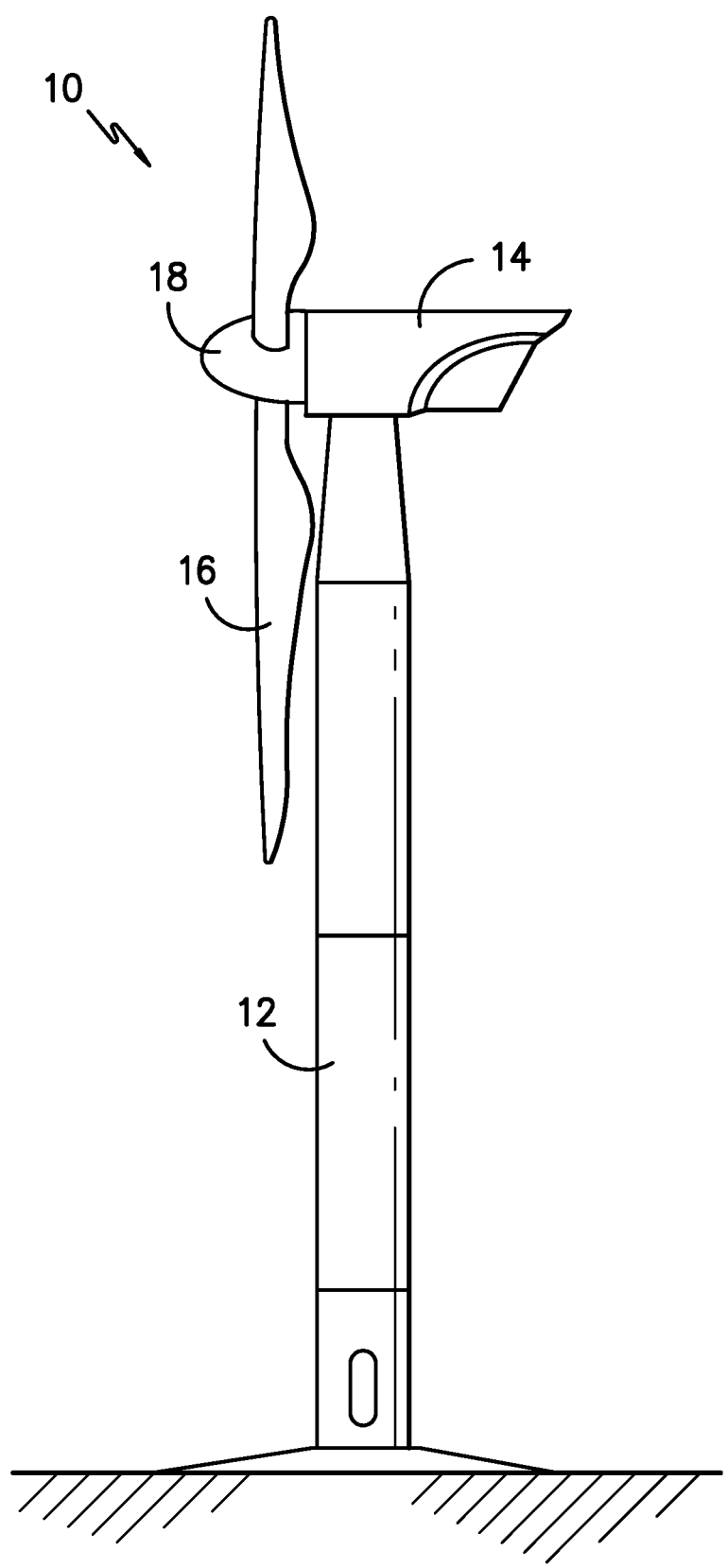
FIG. -1-

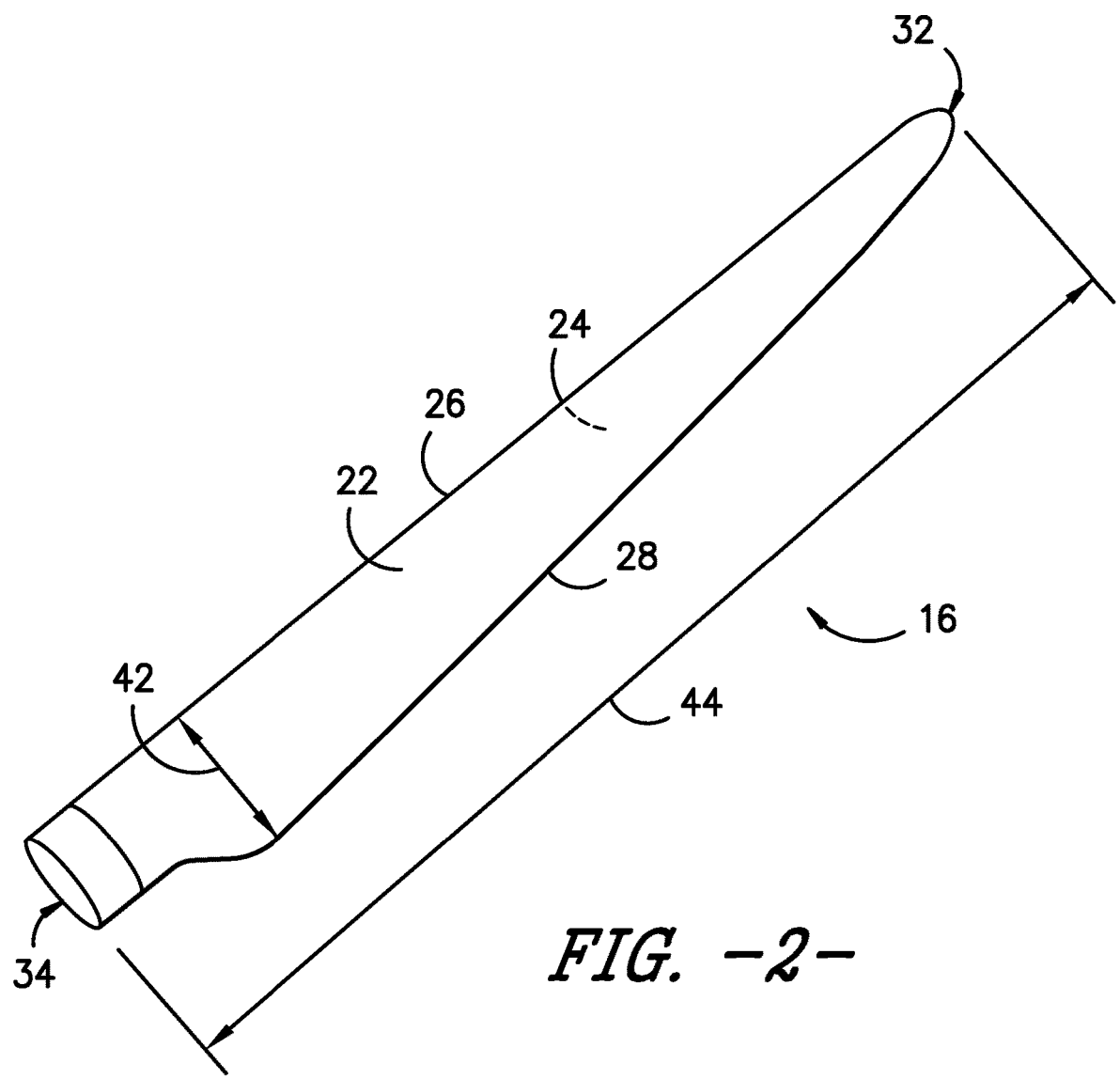
FIG. -2-

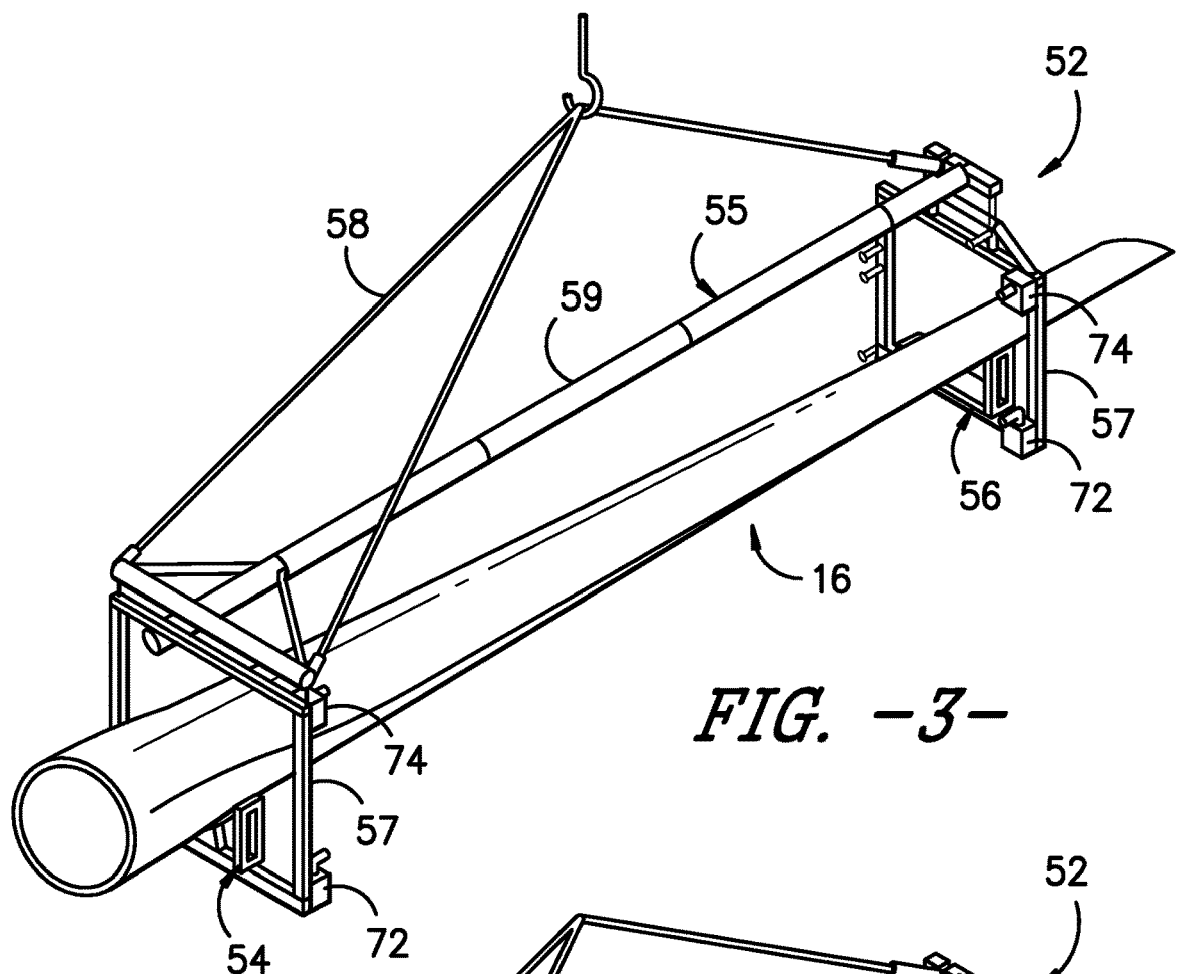
FIG. -3-
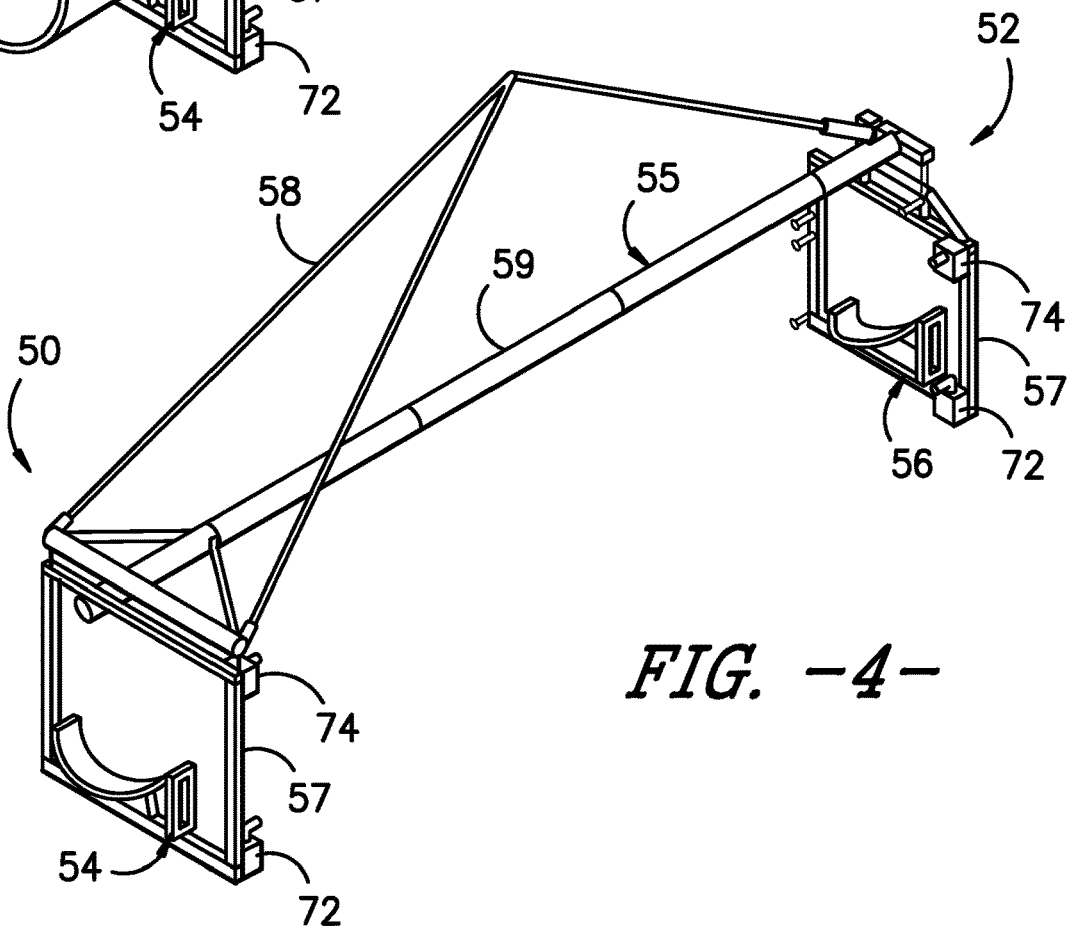
FIG. -4-

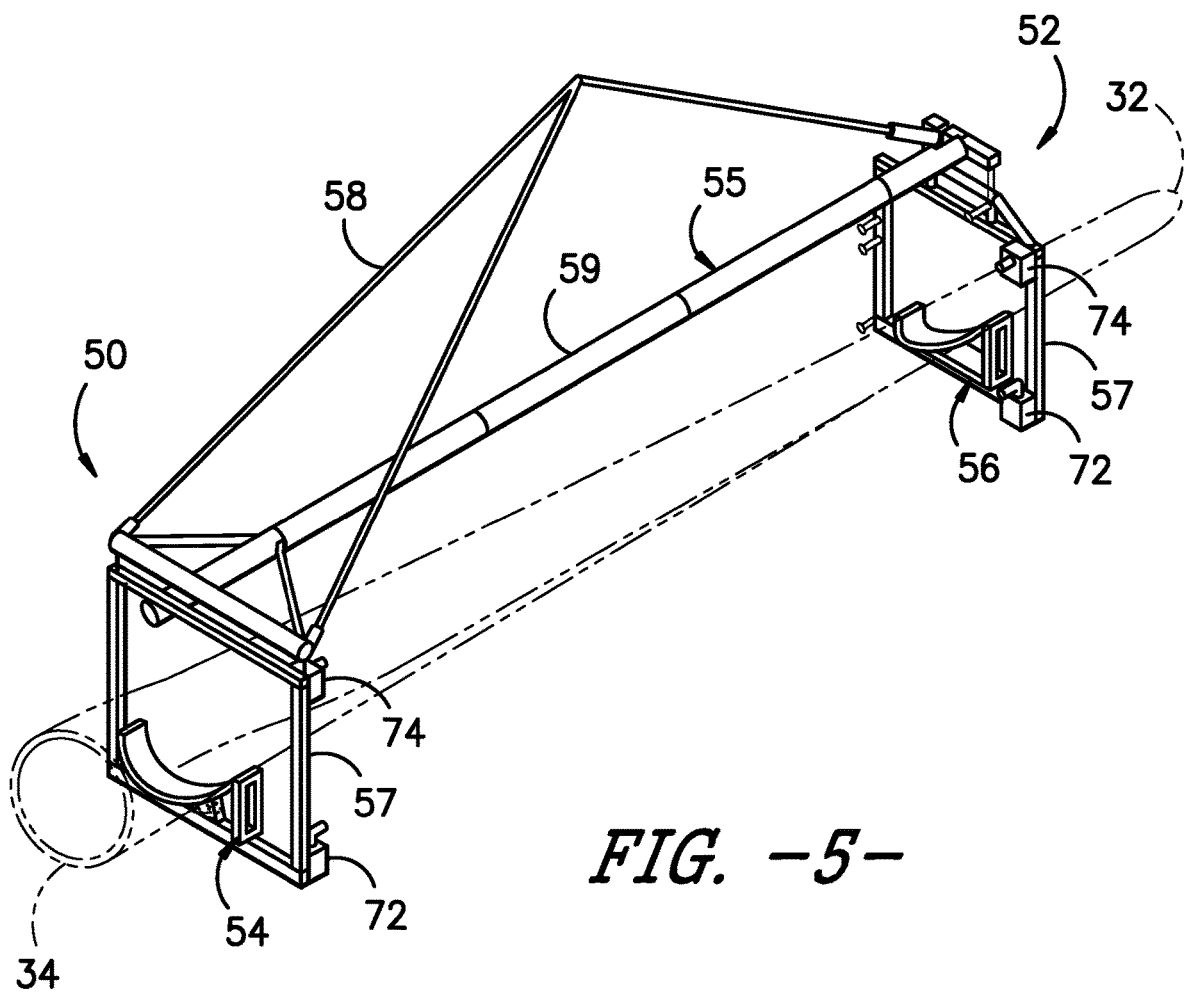
FIG. -5-

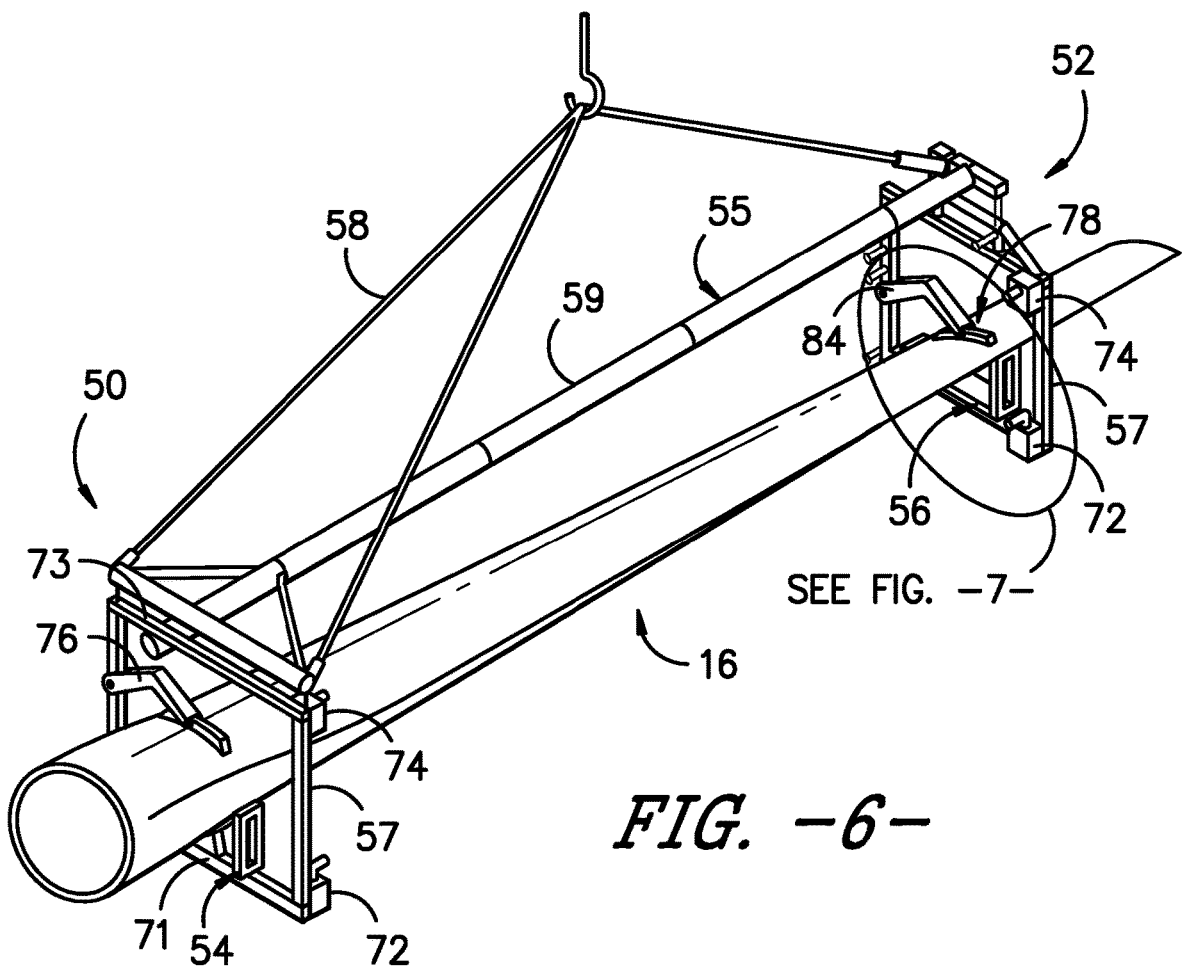
FIG. -6-
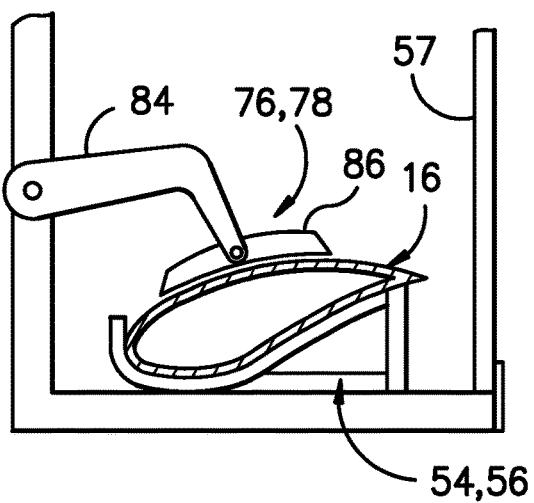
FIG. -7-

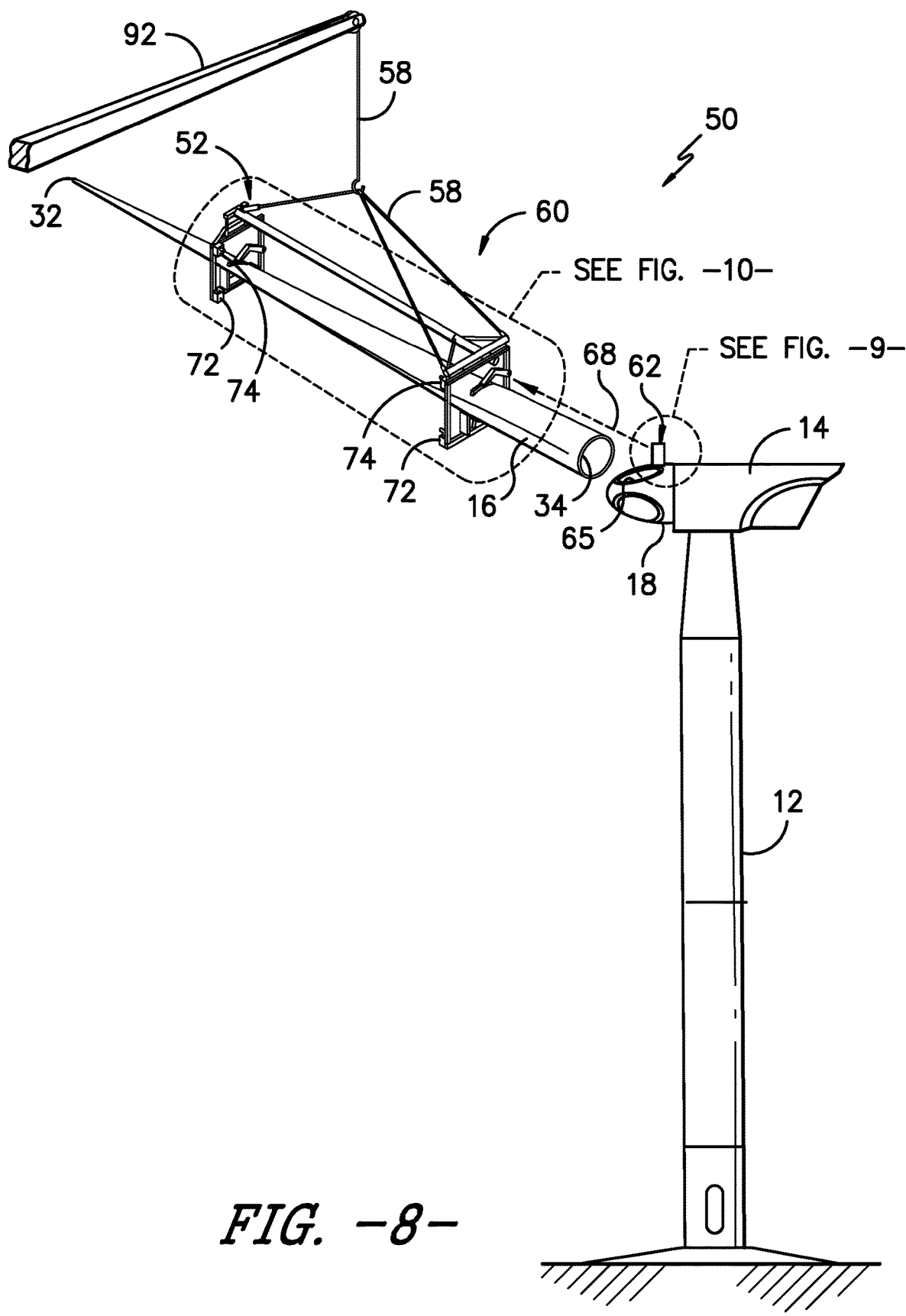
FIG. -8-

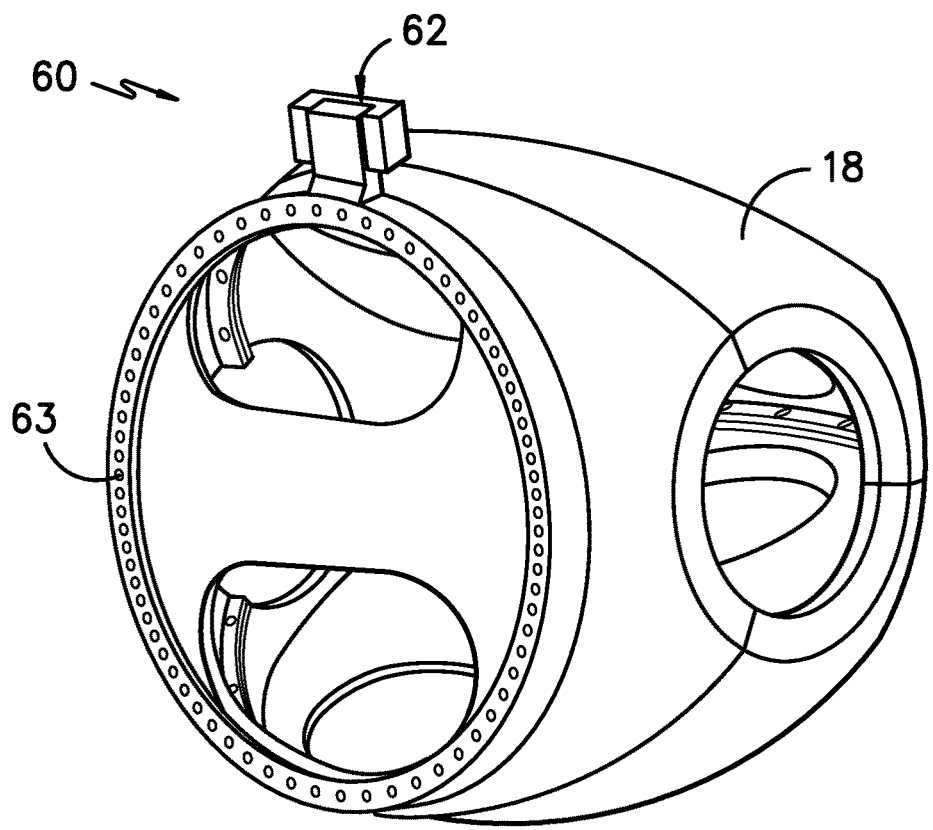
FIG. -9-
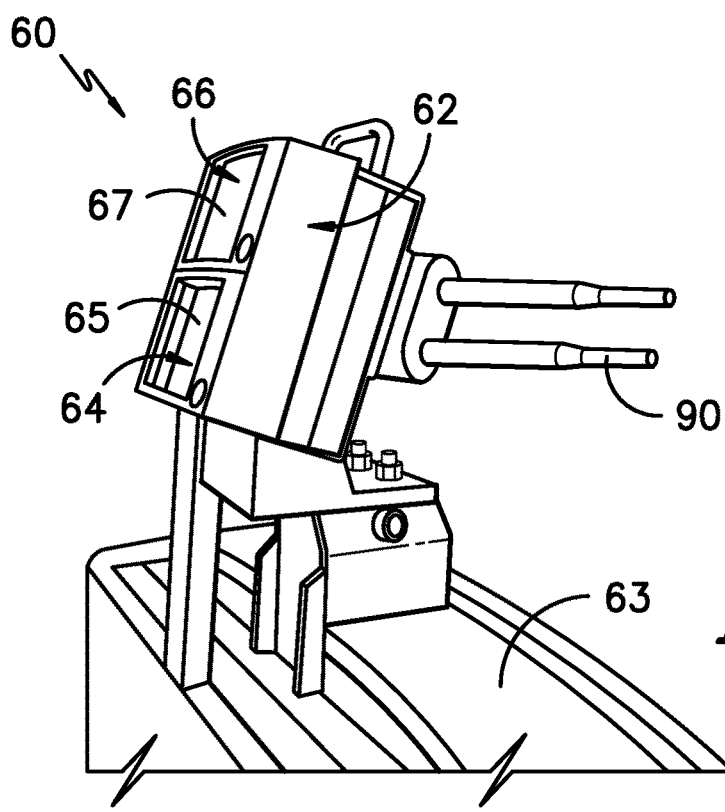
FIG. -10-

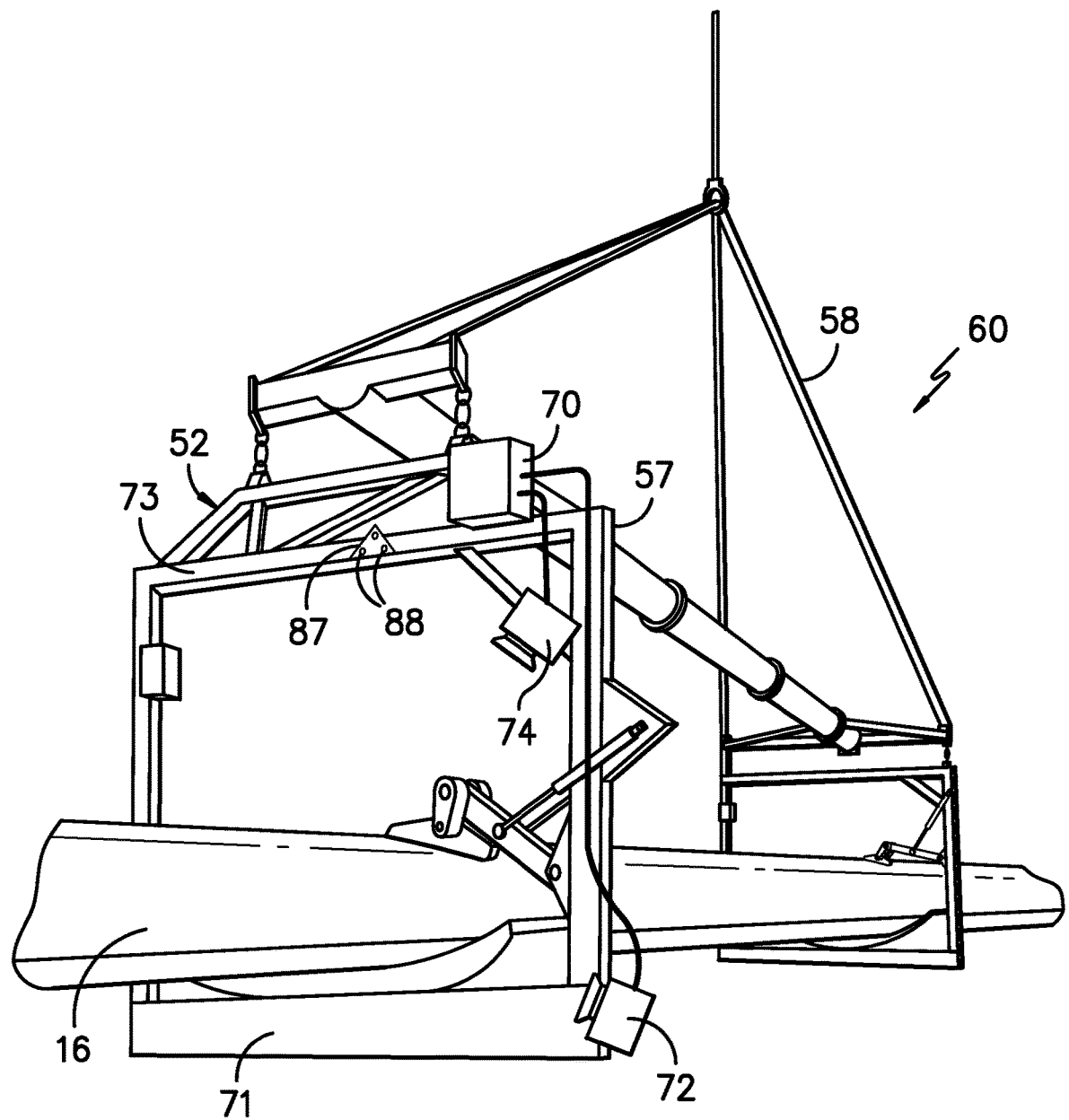
FIG. -11-

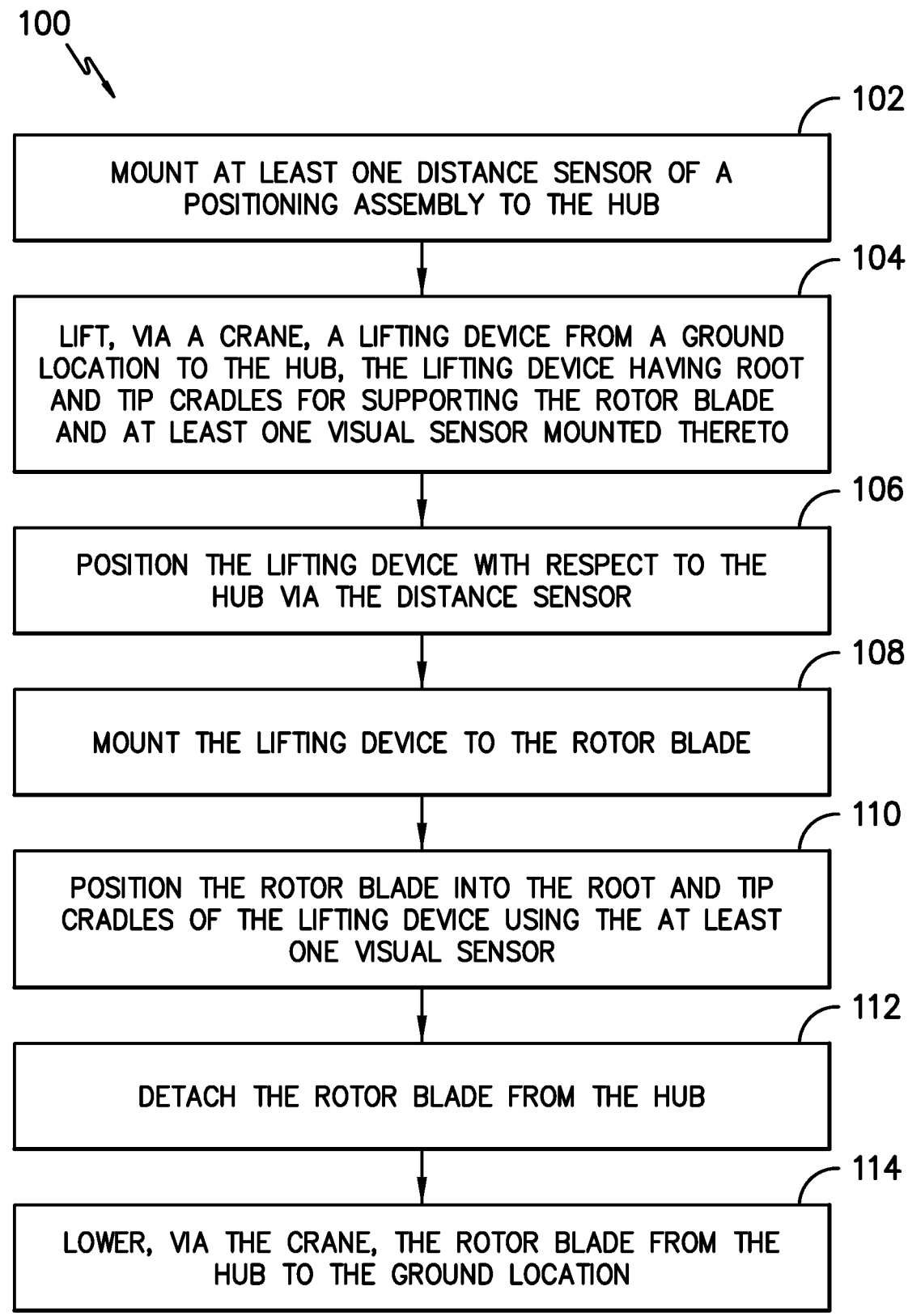
FIG. -12-

POSITIONING ASSEMBLY FOR A WIND TURBINE ROTOR BLADE LIFTING DEVICE

FIELD

The present disclosure relates in general to wind turbines, and more particularly to a positioning assembly for lifting devices for wind turbine rotor blades.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The typical construction of a wind turbine involves erecting the tower and then connecting various other components to the erected tower. For example, the rotor blades may be lifted to an appropriate height and connected to the tower after installation of the tower onto a foundation. In some cases, each of the rotor blades is connected to a hub before lifting, and the connected rotor blades and hub are then lifted and connected to the tower as a unit. Trends towards taller towers and larger rotor diameters, however, can limit and/or preclude lifting such units to the tower due to size and/or cost. More specifically, as the rotor diameter and/or mass and hub height increases, there are few (if any) cranes that can lift such structures. Further, the sail area can become so large, that the available wind window to conduct such lifts approaches zero, i.e. the cranes cannot lift the rotor without tipping over.

Thus, current systems and methods for lifting the rotor blades involve the use of a cradle, sling, or clamping-type blade lifting device that supports an individual rotor blade therein and is lifted to the tower using a crane. As such, each of the rotor blades is then connected to the tower, and the crane is then disconnected therefrom. To overcome safety risks, many modern lifting tools also incorporate positive clamping means to prevent blade movement or loss of control during the lifting process.

For such lifting device, it is important that the rotor blade be properly positioned therein such that when the rotor blade is lifted uptower or lowered to the ground, the blade is in the correct orientation with respect to the hub so that it can be easily attached thereto, e.g. via a pitch bearing, or detached therefrom. Thus, it would also be advantageous to know the location of the lifting device with respect to the hub.

In view of the aforementioned, the art is continuously seeking new and improved lifting devices and accessories thereof for wind turbine rotor blades. As such, the present disclosure is directed to a positioning assembly for lifting devices for wind turbine rotor blades that assists in installing or removing and lowering the rotor blade to and from the hub.

BRIEF DESCRIPTION

Aspects and advantages of the invention will be set forth in part in the following description, or may be obvious from the description, or may be learned through practice of the invention.

In one aspect, the present disclosure is directed to a lift system for a rotor blade of a wind turbine. The lift system includes a lifting device having at least one cradle. The cradle has a profile that corresponds to at least one of the exterior surfaces of the rotor blade so as to support at least a portion of the rotor blade. Further, the lift system includes a positioning assembly having at least one distance sensor mounted to the hub and at least one visual sensor mounted to the lifting device. Thus, the distance sensor is configured to identify a distance from the hub to the lifting device and the visual sensor is configured to identify a position of the rotor blade in the cradle.

In one embodiment, the distance sensor(s) may include an emitter and a receiver. More specifically, in such embodiments, the emitter may include an infrared light and the receiver may include a camera. In another embodiment, the distance sensor(s) may be mounted to a pitch bearing of the wind turbine.

In further embodiments, the positioning assembly may further include a positioning target secured to the lifting device. As such, the emitter is configured to emit signals to the positioning target, whereas the receiver is configured to receive signals from the positioning target to identify the distance from the hub to the lifting device. In several embodiments, the positioning target may be secured to the lifting device via one or more magnets.

In additional embodiments, the distance sensor(s) may have Wi-Fi capabilities.

In yet another embodiment, the visual sensor(s) may include, at least, a first set of sensors having a first visual sensor and a second visual sensor. In such embodiments, the first and second visual sensors may include cameras.

In further embodiments, the lifting device may include a root cradle for supporting the root of the rotor blade and a tip cradle for supporting the tip of the rotor blade. As such, in one embodiment, the first and second visual sensors may be mounted to the root cradle. More specifically, in certain embodiments, the first visual sensor may be mounted to a lower support member of the root cradle so as to view a span-wise direction of the rotor blade and the second visual sensor may be mounted to an opposing upper support member of the root cradle so as to view a chord-wise direction of the rotor blade.

In still further embodiments, the visual sensor(s) may also include a second set of visual sensors mounted to the tip cradle.

In particular embodiments, the lifting device may further include a structural frame body for connecting and supporting the root cradle and the tip cradle as well as one or more safety features configured to restrict movement of the rotor blade.

In another aspect, the present disclosure is directed to a method for lowering a rotor blade from a hub mounted atop a tower of a wind turbine. The method includes mounting at least one distance sensor of a positioning assembly to the hub. The method also includes lifting, via a crane, a lifting device from a ground location to the hub. Further, as mentioned, the lifting device may include root and tip cradles for supporting the rotor blade and at least one visual sensor mounted thereto. As such, the method may also include positioning the lifting device with respect to the hub via the distance sensor. Another step includes mounting the lifting device to the rotor blade. In addition, the method includes positioning the rotor blade into the root and tip cradles of the lifting device using the at least one visual sensor. Still additional steps include detaching the rotor blade from the hub and lowering, via the crane, the rotor blade from the hub to the ground location. It should also be understood that the method may further include any of the additional features and/or steps as described herein.

In addition, the method may also include securing a positioning target to the lifting device, emitting, via an emitter of the at least one distance sensor, one or more signals to the positioning target, and receiving, via a receive of the at least one distance sensor, the one or more signals from the positioning target to identify the distance between the lifting device and the hub.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a side view of one embodiment of a rotor blade according to the present disclosure;

FIG. 3 illustrates a perspective view of one embodiment of a lift system according to the present disclosure;

FIG. 4 illustrates a perspective view of one embodiment of a lifting device according to the present disclosure;

FIG. 5 illustrates a perspective view of another embodiment of a lift system according to the present disclosure, particularly illustrating the root and tip cradles thereof;

FIG. 6 illustrates a perspective view of yet another embodiment of a lift system according to the present disclosure, particularly illustrating various safety features thereof;

FIG. 7 illustrates a detailed, side view of the various safety features of the lift system of FIG. 6;

FIG. 8 illustrates a perspective view of one embodiment of a wind turbine during installation thereof, particularly illustrating a rotor blade of the wind turbine being lifted uptower via a lift system and the lift system being positioned via a positioning assembly thereof according to the present disclosure;

FIG. 9 illustrates a partial, perspective view of one embodiment of a hub of a wind turbine according to the present disclosure, particularly illustrating a distance sensor of the positioning assembly mounted to a pitch bearing of the hub;

FIG. 10 illustrates a detailed, perspective view of one embodiment of the distance sensor of the positioning assembly of FIG. 9;

FIG. 11 illustrates a perspective view of one embodiment of the lift system having at least a portion of a positioning assembly mounted to a lifting device thereof according to the present disclosure, particularly illustrating the visual sensors and positioning target of the positioning assembly; and FIG. 12 illustrates a flow diagram of one embodiment of a method for lowering a rotor blade from a hub mounted atop a tower of a wind turbine according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a lift system for a wind turbine rotor blade. More specifically, the lift system includes a lifting device having at least one cradle. The cradle has a profile that corresponds to at least one of the exterior surfaces of the rotor blade so as to support at least a portion of the rotor blade. Further, the lift system includes a positioning assembly having at least one distance sensor mounted to the hub and at least one visual sensor mounted to the lifting device. Thus, the distance sensor is configured to identify a distance from the hub to the lifting device and the visual sensor is configured to identify a position of the rotor blade in the cradle.

The present disclosure provides many advantages not present in the prior art. For example, the positioning assembly of the present disclosure is configured to identify how far is the lifting device is from the hub. In parallel, the visual sensor(s) mounted to the lifting device check the rotor blades position within the lifting device. Such data can be viewed in real-time by an operator, e.g. from a portable device, so as to assist with installing or removing the rotor blade from the hub.

Referring now to the drawings, FIG. 1 illustrates a wind turbine 10 of conventional construction. The wind turbine 10 includes a tower 12 with a nacelle 14 mounted thereon. A plurality of rotor blades 16 are mounted to a rotor hub 18, such as via the roots (discussed below) of the rotor blades 16 via a pitch bearing 63 (FIG. 8), which is in turn connected to a main flange that turns a main rotor shaft (not shown). The wind turbine power generation and control components are typically housed within the nacelle 14 and/or the tower 12. The view of FIG. 1 is provided for illustrative purposes only to place the present invention in an exemplary field of use. It should be appreciated that the invention is not limited to any particular type of wind turbine configuration.

Referring to FIG. 2, a perspective view of one of rotor blade 16s according to the present disclosure is illustrated. As shown, the rotor blade 16 includes exterior surfaces defining a pressure side 22 and a suction side 24 extending between a leading edge 26 and a trailing edge 28, and may extend from a blade tip 32 to a blade root 34. The exterior surfaces may be generally aerodynamic surfaces having generally aerodynamic contours, as is generally known in the art. In some embodiments, the rotor blade 16 may include a plurality of individual blade segments aligned in an end-to-end order from the blade tip 32 to the blade root 34. Each of the individual blade segments may be uniquely configured such that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flap-wise direction and/or in a generally edge-wise direction. The flap-wise direction may generally be construed as the direction (or the opposite direction) in which the aerodynamic lift acts on the rotor blade 16. The edge-wise direction is generally perpendicular to the flap-wise direction. Flap-wise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

Still referring to FIG. 2, the rotor blade 16 may further define chord 42 and a span 44. Further, as shown in FIG. 2, the chord 42 may vary throughout the span 44 of the rotor blade 16. Thus, a local chord may be defined for the rotor blade 16 at any point on the rotor blade 16 along the span 44. The exterior surfaces, as discussed above, may extend in the generally span-wise direction between the tip 32 and root 34.

Referring now to FIGS. 3 through 11, various components of a lift system 50 for lifting a rotor blade 16 of a wind turbine 10 uptower according to the present disclosure are illustrated. As shown in FIGS. 3 and 4, the lift system 50 includes a lifting device 52 configured to support at least a portion of one of the rotor blades 16. More specifically, as shown, the lifting device 52 includes at least one cradle 54, 56 and a positioning assembly 60 configured with the lifting device 52, which is described in more detail below. Further, as shown generally in FIGS. 3-6, the lifting device 52 includes a root cradle 54 and a tip cradle 56 for supporting portions of the blade 16 near the blade root 34 and the blade tip 32, respectively. Further, in certain embodiments, a portion of each of the cradles 54, 56 generally has a profile that corresponds to at least one of the exterior surfaces of the rotor blade 16 so as to support at least a portion of the rotor blade 16. For example, as shown in FIGS. 3 and 5, the root cradle 54 has a profile that generally corresponds to the blade root 34 of the rotor blade 16, whereas the tip cradle 56 has a profile that generally corresponds to the blade tip 32 of the rotor blade 16.

In addition, as shown in FIGS. 3-5, the lifting device 52 may include a structural frame body 55 for connecting and supporting the root cradle 54 and the tip cradle 56. More specifically, as shown, the structural frame body 55 may include one or more cradle support members 57 configured to support each of the root and tip cradles 54, 56, respectively. Thus, as shown, the root and tip cradles 54, 56 may be mounted to respective ends of the structural frame body 55. Further, the cradle supports 57 may be joined or coupled together via a main support 59 or beam. Thus, in additional embodiments, the lift system 50 may also include a crane 92 (FIG. 8) and a crane cable or sling 58 (FIGS. 3, 4, and 8). In such embodiments, the crane cable or sling 58 may be connected to the crane 92 and the structural frame body 55 (i.e. at a central location along the main support 59) for lifting and/or lowering the rotor blade 16 between the hub 18 and the tower 12. More specifically, as shown, the crane cable or sling 58 may include a synthetic fabric sling and a point attachment at the center of the structural frame body 55 so as to provide stability to the lifting device 52 during lifting and/or lowering.

The crane 92 as described herein may be any suitable machine for generally lifting equipment and/or materials, such as a mobile crane, a floating crane, an aerial crane, or a fixed crane (such as a tower crane), as is generally known in the art. Further, the crane cable or sling 58 may be connected to the crane 92, and the crane 92 may control movement of the crane cable or sling 58, as is generally known in the art.

Referring now to FIGS. 6 and 7, the lift system 50 may also include one or more safety features 76, 78. For example, as shown, the safety features may include a first safety feature 76 configured with the root cradle 54 and a second safety feature 78 configured with the tip cradle 56. More specifically, as shown, the first and second safety features 76, 78 may include a non-contact gate having an optionally pivotable arm 84 with an air-foil shaped attachment 86 at a distal end thereof. As such, the first and second safety features 76, 78 are configured to prevent the rotor blade 16 from dislodging from the cradles 54, 56. More specifically, the geometry of the airfoil-shaped attachment 86 is configured to restrict movement of the blade root 34 and the blade tip 32 of the rotor blade 16.

Referring generally to FIGS. 3-6 and 8-11, the lift system 50 also includes a positioning assembly 60 having at least one distance sensor 62 mounted to the hub 18 and at least one visual sensor 72, 74 mounted to the lifting device 52. Thus, as shown in FIG. 8, the distance sensor 62 is configured to identify a distance 68 from the hub 18 to the lifting device 52 and the visual sensor(s) 72, 74 is configured to identify a position of the rotor blade 16 in the cradle(s) 54, 56. As such, the distance 68 and/or the position of the rotor blade 16 can be viewed in real-time by an operator, e.g. from a portable device, so as to assist with installing or removing the rotor blade 16 from the hub 18.

Referring particularly to FIG. 10, in one embodiment, the distance sensor(s) 62 may include an emitter 64 and a receiver 66. More specifically, in such embodiments, the emitter 64 may include an infrared light 65 and the receiver 66 may include a camera 67. In another embodiment, the distance sensor(s) 62 may be mounted to one of the pitch bearings 63 of the wind turbine 10. In additional embodiments, the distance sensor(s) 62 may have Wi-Fi capabilities, e.g. via a Wi-Fi antenna 90.

Referring now to FIG. 11, the positioning assembly 60 may further include a positioning target 87 secured to the lifting device 52. For example, in several embodiments, the positioning target 87 may be secured to the lifting device 52 via one or more magnets 88. As such, the emitter 64 is configured to emit signals towards the positioning target 87, whereas the receiver 66 is configured to receive signals from the positioning target 87 so to identify the distance 68 from the hub 18 to the lifting device 52.

In yet another embodiment, the visual sensor(s) 72, 74 may include, at least, a first set of sensors having a first visual sensor 72 and a second visual sensor 74. In such embodiments, for example, the first and second visual sensors 72, 74 may include cameras. As such, in one embodiment, the first and second visual sensors 72, 74 may be mounted to the root cradle 54. In addition, the visual sensor(s) 72, 74 may also include a second set of visual sensors mounted to the tip cradle 56. More specifically, as shown in FIG. 11, the first visual sensor 72 may be mounted to a lower support member 71 of the root cradle 54 so as to view a span-wise direction of the rotor blade 16, whereas the second visual sensor 74 may be mounted to an opposing upper support member 73 of the root cradle 54 so as to view a chord-wise direction of the rotor blade 16. It should be understood that the visual sensors 72, 74 may further be mounted to any suitable location on the structural frame body 55 of the lifting device 52 (e.g. any of the support members 57).

Referring still to FIG. 11, as shown in the illustrated embodiment, the positioning assembly 60 may also include a controller 70 configured to receive one or more signals from the various sensors (e.g. sensors 62, 72, 74) described herein. As shown, the controller 70 as described herein may be an independent controller separate from the turbine controller or may be incorporated into the turbine controller of the wind turbine 10 (not shown). Further, the controller 70 may include any suitable control system including but not limited to a handheld remote, a personal digital assistant, cellular telephone, a separate pendant controller, or a computer. Further, the controller 70 may include suitable processing apparatus and software for operating the positioning assembly 60 as desired or required.

The present disclosure is further directed to a method for lifting or lowering a rotor blade 16 to and from a hub 18 mounted atop a tower 12 of a wind turbine 10 using the lifting device 52 and the positioning assembly 60 described herein. For example, FIG. 12 illustrates a flow diagram of one embodiment of a method 100 for lowering a rotor blade 16 from a hub 18 mounted atop a tower 12 of a wind turbine 10. As shown 102, the method 100 includes mounting at least one distance sensor 62 of the positioning assembly 60 to the hub 18. As shown at 104, the method 100 includes lifting, via a crane 92, the lifting device 52 from a ground location to the hub 18. As shown at 106, the method 100 includes positioning the lifting device 52 with respect to the hub 18 via the distance sensor 60. As shown at 108, the method 100 includes mounting the lifting device 52 to the rotor blade 16. As shown at 110, the method 100 includes positioning the rotor blade 16 into the root and tip cradles 54, 56 of the lifting device 52 using the at least one visual sensor 72, 74. As shown at 112, the method 100 includes detaching the rotor blade 16 from the hub 18. As shown at 114, the method 100 includes lowering, via the crane 92, the rotor blade 16 from the hub 18 to the ground location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A lift system for lifting or lowering a rotor blade to and from a hub mounted atop a tower of a wind turbine, the lift system comprising:
a lifting device comprising at least one cradle, the at least one cradle comprising a profile that corresponds to at least one of the exterior surfaces of the rotor blade so as to support at least a portion of the rotor blade; and
a positioning assembly comprising at least one distance sensor mounted to the hub, a positioning target secured to the lifting device via one or more magnets, and at least one visual sensor mounted to the lifting device, the distance sensor configured to identify a distance from the hub to the lifting device, the at least one visual sensor configured to identify a position of the rotor blade in the cradle.

2. The lift system of claim 1, wherein the at least one distance sensor comprises an emitter and a receiver.

3. The lift system of claim 2, wherein the emitter comprises an infrared light and the receiver comprises a camera.

4. The lift system of claim 1, wherein the at least one distance sensor is mounted to a pitch bearing of the wind turbine.

5. The lift system of claim 3, wherein the emitter is configured to emit signals to the positioning target, the receiver is configured to receive signals from the positioning target to identify the distance from the hub to the lifting device.

6. The lift system of claim 1, wherein the at least one distance sensor comprises Wi-Fi capabilities.

7. The lift system of claim 1, wherein the at least one visual sensor comprises, at least, a first set of sensors comprising a first visual sensor and a second visual sensor.

8. The lift system of claim 7, wherein the first and second visual sensors comprise cameras.

9. The lift system of claim 7, wherein the lifting device further comprises a root cradle for supporting the root of the rotor blade and a tip cradle for supporting the tip of the rotor blade.

10. The lift system of claim 9, wherein the first and second visual sensors are mounted to the root cradle.

11. The lift system of claim 10, wherein the first visual sensor is mounted to a lower support member of the root cradle so as to view a span-wise direction of the rotor blade and the second visual sensor is mounted to an opposing upper support member of the root cradle so as to view a chord-wise direction of the rotor blade.

12. The lift system of claim 7, wherein the at least one visual sensor comprises, at least, a second set of visual sensors mounted to the tip cradle.

13. The lift system of claim 9, wherein the lifting device further comprises a structural frame body for connecting and supporting the root cradle and the tip cradle.

14. The lift system of claim 1, further comprising one or more safety features configured to restrict movement of the rotor blade.

15. A method for lowering a rotor blade from a hub mounted atop a tower of a wind turbine, the method comprising:
mounting at least one distance sensor of a positioning assembly to the hub;
lifting, via a crane, a lifting device from a ground location to the hub, the lifting device having root and tip cradles for supporting the rotor blade, at least one visual sensor mounted thereto, and a positioning target secured to the lifting device via one or more magnets;
positioning the lifting device with respect to the hub via the distance sensor;
mounting the lifting device to the rotor blade;
positioning the rotor blade into the root and tip cradles of the lifting device using the at least one visual sensor;
detaching the rotor blade from the hub; and
lowering, via the crane, the rotor blade from the hub to the ground location,
wherein the root and tip cradles each have a profile that corresponds to respective root and tip exterior surfaces of the rotor blade.

16. The method of claim 15, wherein mounting the at least one distance sensor of the positioning assembly to the hub further comprises mounting the at least one distance sensor to a pitch bearing of the hub.

17. The method of claim 15, wherein positioning the lifting device with respect to the hub via the distance sensor further comprises:
   securing a positioning target to the lifting device;
   emitting, via an emitter of the at least one distance sensor, one or more signals to the positioning target;
   receiving, via a receiver of the at least one distance sensor, the one or more signals from the positioning target to identify a distance between the lifting device and the hub.

18. The method of claim 15, wherein the at least one visual sensor comprises, at least, a first set of sensors comprising a first visual sensor and a second visual sensor.

19. The method of claim 18, further comprising:
   mounting the first visual sensor to the root cradle to a lower support member of the root cradle so as to view a span-wise direction of the rotor blade; and,
   mounting the second visual sensor to an opposing upper support member of the root cradle so as to view a chord-wise direction of the rotor blade.

20. A lift system for lifting or lowering a rotor blade to and from a hub mounted atop a tower of a wind turbine, the lift system comprising:
   a lifting device comprising a root cradle for supporting the root of the rotor blade and a tip cradle for supporting the tip of the rotor blade; and
   a positioning assembly comprising at least one distance sensor mounted to the hub and at least one visual sensor mounted to the lifting device, the distance sensor configured to identify a distance from the hub to the lifting device, the at least one visual sensor configured to identify a position of the rotor blade in the cradle, the visual sensor comprising at least, a first set of sensors comprising a first visual sensor and a second visual sensor, the first visual sensor being mounted to a lower support member of the root cradle so as to view a span-wise direction of the rotor blade and the second visual sensor being mounted to an opposing upper support member of the root cradle so as to view a chord-wise direction of the rotor blade.

* * * * *